(12) United States Patent
Hermanns

(10) Patent No.: US 7,206,264 B1
(45) Date of Patent: Apr. 17, 2007

(54) METHOD FOR REGULATING THE TRACKING OF A SCANNING DEVICE AND DRIVE FOR THE SAME

(75) Inventor: Ingo Hermanns, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 10/130,458

(22) PCT Filed: Oct. 14, 2000

(86) PCT No.: PCT/DE00/03626

§ 371 (c)(1),
(2), (4) Date: Aug. 15, 2002

(87) PCT Pub. No.: WO01/37271

PCT Pub. Date: May 25, 2001

(30) Foreign Application Priority Data

Nov. 17, 1999 (DE) ................................ 199 55 251

(51) Int. Cl.
*G11B 7/00* (2006.01)
(52) U.S. Cl. ................................. 369/44.29; 369/44.25
(58) Field of Classification Search ............ 369/44.25, 369/44.28, 44.29, 53.23, 53.35; 360/77.02, 360/78.06, 78.04, 77.03
See application file for complete search history.

(56) References Cited

U.S. PATENT DOCUMENTS

| 3,610,973 | A | * | 10/1971 | Bauer et al. .................... 310/15 |
| 4,046,386 | A | * | 9/1977 | Gosling et al. ............. 369/220 |
| 4,692,915 | A | * | 9/1987 | Moriya et al. ............ 369/53.18 |
| 4,764,860 | A | * | 8/1988 | Takao ....................... 360/77.02 |
| 5,014,256 | A | * | 5/1991 | Horie et al. .............. 369/44.35 |
| 5,033,037 | A | * | 7/1991 | Yanagi ..................... 369/30.17 |
| 5,168,185 | A | * | 12/1992 | Umehara et al. ......... 360/265.8 |
| 5,291,467 | A | * | 3/1994 | Ishiwata et al. .......... 369/44.28 |
| 5,581,521 | A | * | 12/1996 | Nomura et al. .......... 369/44.35 |

(Continued)

FOREIGN PATENT DOCUMENTS

DE 196 42 343 4/1998

(Continued)

OTHER PUBLICATIONS

*Patent Abstracts of Japan*, vol. 015, No. 480, p. 1284 (Dec. 5, 1991) (JP 03 207063, Sep. 10, 1991, Abstract)*.

*Primary Examiner*—Andrea Wellington
*Assistant Examiner*—Peter Vincent Agustin
(74) *Attorney, Agent, or Firm*—Kenyon & Kenyon LLP

(57) ABSTRACT

A method is provided for regulating the tracking of a scanning device, for example, a read/write head, of a drive. A drive for storage media having a scanning device is also provided, permitting improved regulation of the positioning of the scanning device. A measured position of scanning device with respect to a storage medium inserted into the drive is compared with a preselected position. Depending on the result of the comparison, at least one actuator is controlled so that the scanning device is moved in the direction of the preselected position. Acceleration acting on the scanning device is measured in a direction of movement of at least one actuator. A correction signal is derived from the measured acceleration and sent to the at least one actuator, the actuator being controlled by the correction signal so that it counteracts the acceleration acting on the scanning device.

8 Claims, 2 Drawing Sheets

U.S. PATENT DOCUMENTS 5,903,408 A * 5/1999 Omi ..................... 360/73.03
6,226,245 B1 * 5/2001 Fueki ..................... 369/53.3

FOREIGN PATENT DOCUMENTS

| EP | 0 217 460 | | 4/1987 |
| EP | 0 735 522 | | 10/1996 |
| JP | 60136972 A | * | 7/1985 |
| JP | 63257975 A | * | 10/1988 |
| JP | 02260287 A | * | 10/1990 |
| JP | 04123374 A | * | 4/1992 |

* cited by examiner

METHOD FOR REGULATING THE TRACKING OF A SCANNING DEVICE AND DRIVE FOR THE SAME

FIELD OF THE INVENTION

The present invention relates to a method of regulating the tracking of a scanning device and a drive for it.

BACKGROUND INFORMATION

German Published Patent Document No. 196 42 343 refers to a method for regulating the focusing of a directed beam of light of a scanning device on a rotating recording medium for reading data on the recording medium and for guiding the beam of light along the data tracks of the recording medium by a regulating circuit. For example, a track regulating circuit containing a power amplifier is provided. The power amplifier is connected to an actuator, which adjusts the regulated position of a lens system of a reading head in the plane of the track with a force $F_T$. The position of the lens system with respect to a compact disc is measured by reference photodiodes mounted on the reading head. Distance $Y_0$ of the lens system from the reading head is altered by the force acting on the lens system in the plane of the track. A disturbance in position brought about by the change in distance $Y_0$ is added at a first summation point together with all position interference quantities in the plane of the track for the movement of the lens system with respect to the compact disc, yielding an overall position error $\Delta Y$ of the track regulation in the plane of the track. A position sensor converts the total position error $\Delta Y$ into electric position error signal TE. At a second summation point, parasitic signals $E_1T$, which originate from defects on the compact disc and interfere with the position determination in the plane of the track, are superimposed on position error signal TE. The resulting signal VT is sent to a correction network of the track regulation. The correction network includes an electronic circuit, the function of which is that of a filter and which should promote the stability and the static and dynamic accuracy of regulation. The output signal of the correction network is sent to the power amplifier. Through such a loop, the reading head may be positioned at a certain track on the surface of the compact disc. Furthermore, inaccuracies in true running, storage or manufacturing of components of the compact disc drive may be compensated for. Finally, reading head position errors caused by external acceleration may be compensated for with respect to the compact disc, such as vibrations.

SUMMARY OF THE INVENTION

It is believed that an exemplary method according to the present invention for regulating the tracking of a scanning device and an exemplary drive according to the present invention for storage media have an advantage in that accelerations acting on the scanning device in a direction of movement of at least one actuator are measured, and a correction signal is derived from the measured accelerations and sent to the at least one actuator, the actuator being controlled by the correction signal, such that it counteracts the accelerations acting on the scanning device. This may permit early compensation of the accelerations acting on the scanning device without having to wait for their effects on the positioning of the scanning device with respect to the storage medium. A position loop for regulating the position of the scanning device with respect to the storage medium may then be operated at a lower loop gain because it need not be used to suppress the effects of external acceleration, e.g., due to vibration. A low loop gain may be desirable because damage on the surface of the storage medium may lead to corruption of the position regulation for the scanning device. These corrupted signals would then be converted to a defective control signal for the actuator, resulting in faulty positioning of the scanning device and thus to malfunctions in the playback of or writing to the storage medium. At a low loop gain, the effects of such faulty positioning and malfunctions may be reduced due to surface damage in the storage medium.

The at least one actuator may be advantageously used as an acceleration sensor. In this manner, the complexity of the components for implementation of an exemplary method according to the present invention and an exemplary drive according to the present invention may be greatly reduced because existing components may also be used for measurement of acceleration, so that their functionality is increased.

DETAILED DESCRIPTION

Figure 1:
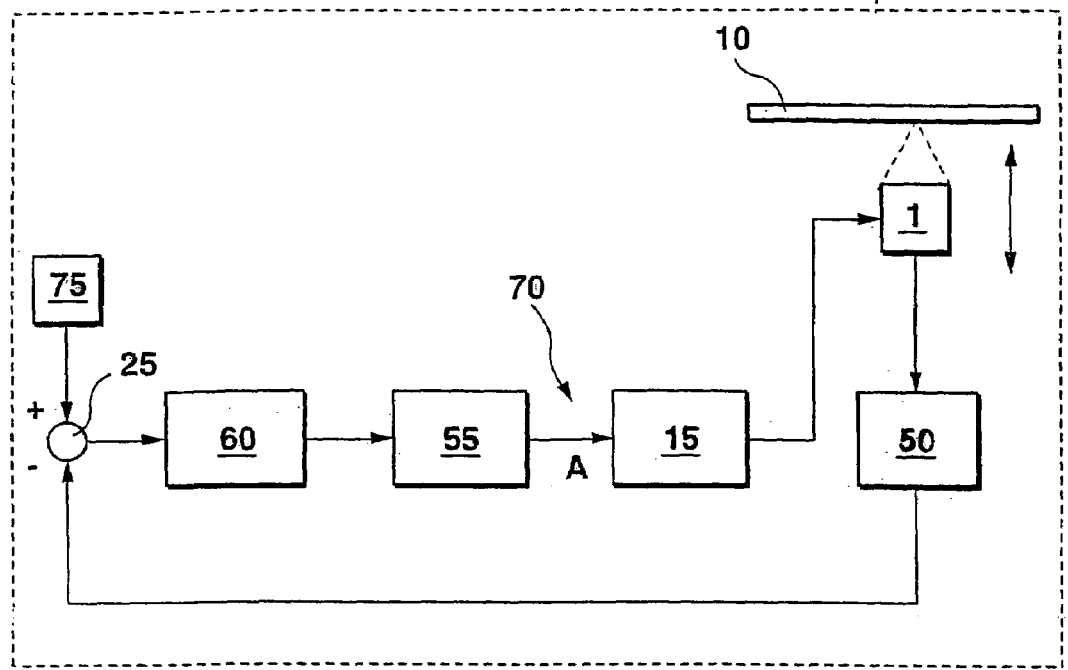
FIG. 1 is a block diagram of a drive for storage media according to the related art.

FIG. 1 shows a drive 5 for a storage medium 10. Storage medium 10 may include an optical, magnetic or magneto-optical storage medium. If storage medium 10 includes an optical storage medium, it may include, for example, a compact disc, a DVD (digital versatile disc) or a CD-ROM. If storage medium 10 includes a magneto-optical storage medium, it may include an MOD (magneto-optical disc), for example, in the form of an MD (minidisc). Drive 5 includes a scanning device 1 for reading and/or writing data from/to storage medium 10. For scanning optical storage media, scanning device 1 may include an optical read/write head, for example, which uses a laser beam to scan storage medium 10, in which case storage medium 10 include an optical storage medium with the data being stored in data tracks. However, scanning device 1 may also include, for example, a magnetic read/write head for scanning magnetic storage media 10.

Through external acceleration of drive 5, e.g., due to vibrations, the position of scanning device 1 with respect to storage medium 10 may be influenced, so that faulty scanning occurs. The acceleration may occur in any direction. If the storage medium 10 is disc-shaped, for example, acceleration may occur in the direction of or perpendicular to the plane of storage medium 10. For example, data may be stored optically on such a disc-shaped storage medium 10 and scanning of storage medium 10 may be performed by scanning device 1 for reading from and/or writing to storage medium 10 by focusing a laser beam on a track of storage medium 10. Acceleration in the direction of the plane of storage medium 10 may then lead to track loss during the scanning operation, whereas acceleration in a direction perpendicular to the plane of storage medium 10 may lead to faulty focusing of the scanned track of storage medium 10 by scanning device 1. A track loop may be used to reverse this track loss, whereas a focusing loop may be used to reverse faulty focusing. An exemplary embodiment according to the present invention is described below on the basis of a focusing loop 70 that reverses the faulty focusing on storage medium 10 caused by acceleration perpendicular to the plane of storage medium 10, but it may also be transferred to a track loop to reverse track losses due to external acceleration.

Focusing loop 70 is illustrated in FIG. 1, which represents the related art with respect to regulation of the focus setting. The position of scanning device 1, with respect to storage medium 10 inserted into drive 5, is measured by a position sensor 50, which, for example, may include one or more photodiodes mounted on scanning device 1, for example. In this context, position sensor 50 determines the distance between scanning device 1 and storage medium 10 in the direction perpendicular to the plane of storage medium 10. The distance measured is the actual value. If the distance between scanning device 1 and storage medium 10 in the direction perpendicular to the plane of storage medium 10 corresponds to a predetermined setpoint value 75, then the focusing of a data track of storage medium 10 by scanning device 1 is error-free. The measured actual value should be corrected to preselected setpoint value 75 by focusing loop 70 to help reduce errors in focusing. Drive 5 is accelerated due to vibration of drive 5, such as that which occurs in operation of a motor vehicle. Due to the different mass and spring constants of storage medium 10 and scanning device 1, a change in the distance of scanning device 1 from storage medium 10 results in the direction perpendicular to the plane of storage medium 10, when an acceleration acts on drive 5 in this direction. Thus, the actual value deviates from the setpoint value 75. Position sensor 50 relays the actual value determined as an electric actual value signal to a first logic device 25. The electric actual value signal is subtracted from an electric setpoint value signal derived from setpoint value 75 in first logic device 25. The differential signal thus formed is an electric focus position error signal, which is sent to a first filter 60. First filter 60 helps to promote the stability and the static and dynamic accuracy of the focus regulation. A suitably filtered electric focus position error signal available at the output of first filter 60 is sent to an amplifier 55. A filtered electric focus position error signal, amplified with the gain of amplifier 55, is then available at the output of amplifier 55 and is sent to an actuator 15. Actuator 15 is connected mechanically to scanning device 1 and derives a force in the direction perpendicular to the plane of storage medium 10 from the electric focus position error signal processed as described above. This force counteracts the deviation in the actual value from setpoint value 75 caused by the acceleration and moves scanning device 1, so that the distance between scanning device 1 and storage medium 10 in the direction perpendicular to the plane of storage medium 10 is adapted to setpoint value 75.

The rate at which the actual value is corrected to setpoint value 75 by focusing loop 70 depends on the total gain prevailing in focusing loop 70. This is referred to as the loop gain, which may be altered, for example, by appropriate adjustment of the gain of amplifier 55. The higher the loop gain, the faster the actual value is corrected to setpoint value 75.

On their scanning surface, storage media 10 often have damage, which corrupts a position measurement in the focus direction perpendicular to the plane of storage medium 10. This may cause a faulty actual value to be delivered. In this situation, a suitably corrupted electric actual value signal is formed, leading to a corrupted electric focus position error signal at the output of first logic device 25. The signal sent from amplifier 55 to actuator 15, which is also known as actuator signal A, is thus corrupted. This then ultimately leads to faulty positioning of scanning device 1 and may result in malfunctions in the scanning of storage medium 10 by scanning device 1. Such faulty positioning of scanning device 1 is promoted by a high loop gain, because this helps promote a rapid correction of the measured actual value to preselected setpoint value 75, regardless of whether the measured actual value is correct or faulty.

Therefore, the choice of the loop gain represents a compromise between the most rapid possible correction of the measured actual value to preselected setpoint value 75 and a way of preventing faulty positioning of scanning device 1 due to excessively rapid correction.

Figure 2:
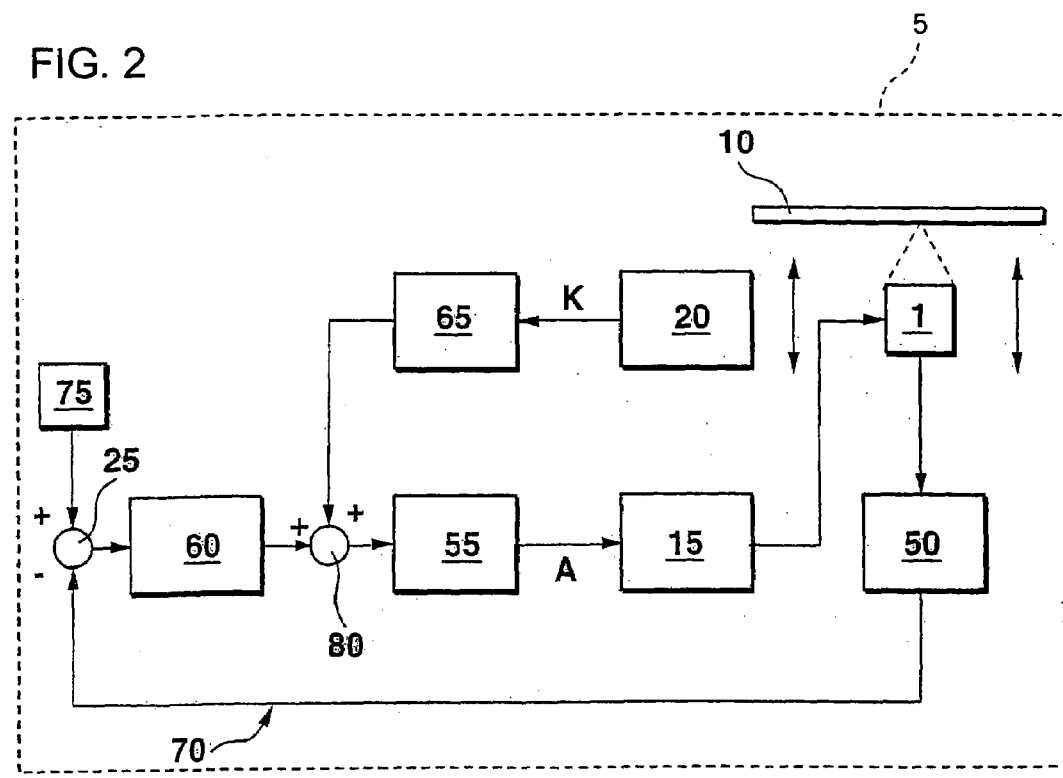
FIG. 2 is a block diagram of a first exemplary drive according to the present invention.

FIG. 2 shows a first exemplary embodiment of a drive 5 according to the present invention. The same reference numbers denote the same elements as in FIG. 1. The focusing loop 70 shown in FIG. 1 is supplemented in this exemplary embodiment as follows: an acceleration sensor 20 is provided to measure the acceleration acting on drive 5. This acceleration occurs in the direction in which actuator 15 is capable of moving scanning device 1, i.e., perpendicular to the plane of storage medium 10 inserted into drive 5. From the known mass and spring constants of drive 5, scanning device 1 and storage medium 10, acceleration sensor 20 may derive an electric correction signal K from the measured acceleration. This signal is used to prevent or compensate for the deviation in the distance between scanning device 1 and storage medium 10 in the direction perpendicular to the plane of storage medium 10 from preselected setpoint value 75 due to this acceleration. Electric correction signal K is sent to a second filter 65, which performs the same function as first filter 60. Then, the suitably filtered correction signal available at the output of second filter 65 is sent to a logic element 80 between first filter 60 and amplifier 55. Logic element 80 then superimposes the filtered focus position error signal on the filtered correction signal and relays the summation signal thus formed to amplifier 55. Amplifier 55 then amplifies this summation signal as described above and sends the amplified summation signal as actuator signal A to actuator 15. Then, due to the component of actuator signal A based on correction signal K, scanning device 1 is moved by actuator 15 in the direction perpendicular to the plane of storage medium 10 in a manner that counteracts the effects of the acceleration acting on drive 5 on the distance between scanning device 1 and storage medium 10 in the direction perpendicular to the plane of storage medium 10. This helps prevent a deviation of the actual value from setpoint value 75 due to this acceleration. This also helps prevent faulty positioning of scanning device 1 with respect to storage medium 10 due to the acceleration acting on drive 5. Therefore, focusing loop 70 need no longer compensate for faulty positioning of scanning device 1 with respect to storage medium 10 due to acceleration acting on drive 5, so that a lower loop gain of focusing loop 70 may be employed in comparison with the arrangement according to FIG. 1, while at the same time greatly suppressing the effects of vibration or acceleration on drive 5, so that the tolerance of focusing loop 70 with respect to damaged surfaces of storage media 10 may be increased.

Figure 3:
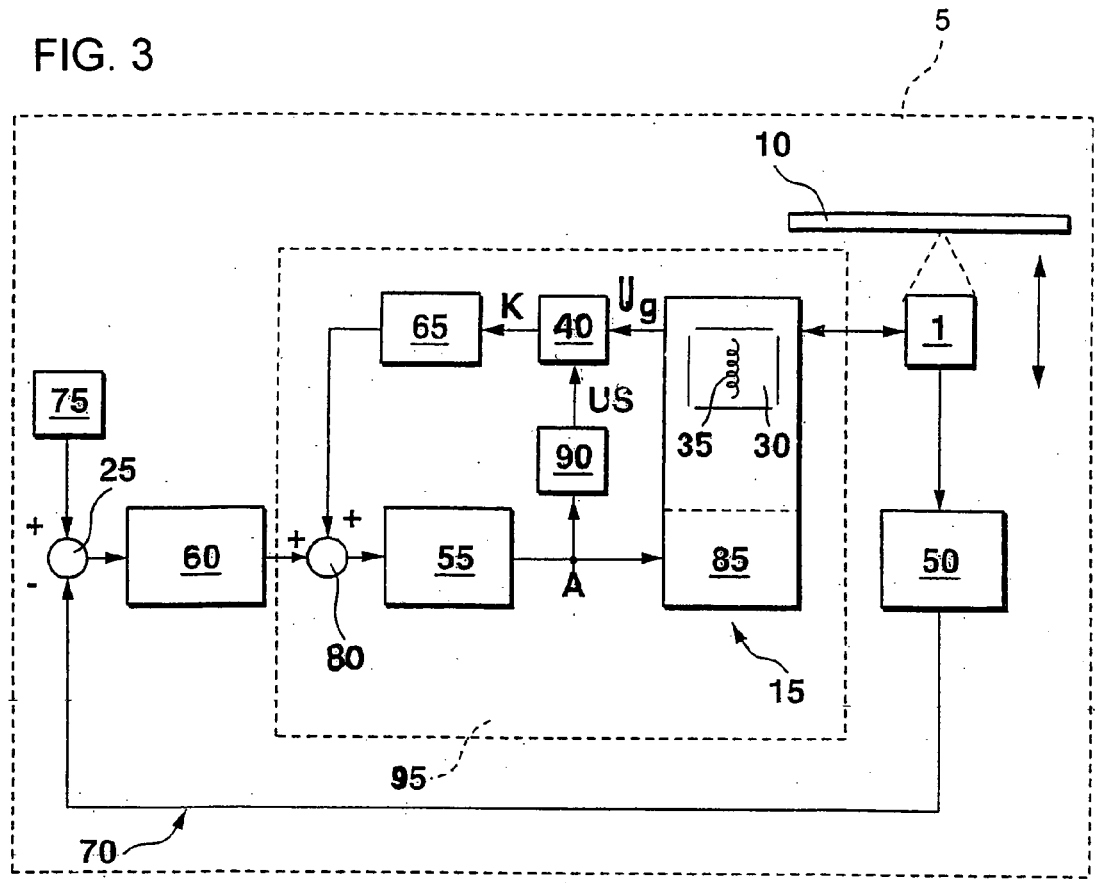
FIG. 3 is a block diagram of a second exemplary drive according to the present invention.
Figure 4:
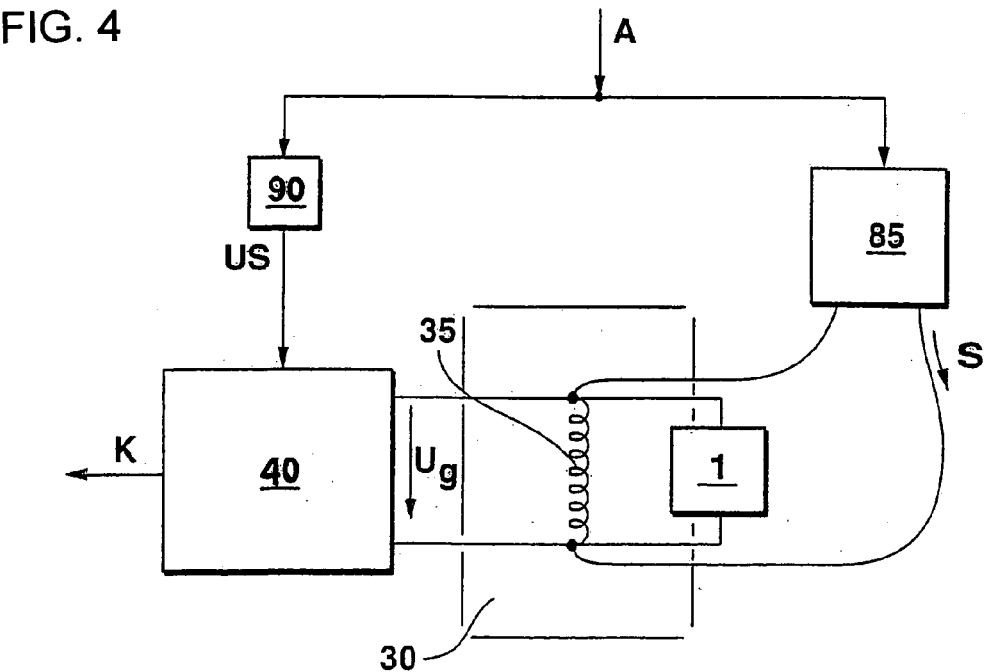
FIG. 4 is a block diagram of an exemplary actuator according to the present invention.

FIG. 3 shows a second exemplary embodiment of drive 5 according to the present invention, in which the same reference numbers denote the same components as in FIG. 2. The arrangement shown in FIG. 2 is modified by the second exemplary embodiment as follows: instead of acceleration sensor 20, a second comparator device 40, as shown in FIG. 3, supplies correction signal K to second filter 65. Second comparator device 40 then compares an electric output signal Ug of actuator 15 with an electric output signal Us of an actuator simulator 90. The actuator signal of amplifier 55 is then sent to actuator simulator 90 and actuator 15. As in the first exemplary embodiment discussed with reference to FIG. 2, the output signal of first filter 60 is additively superimposed on the correction signal filtered by second filter 65 by logic device 80, and the summation signal thus formed is sent to amplifier 55. Otherwise, focusing loop 70 according to the second exemplary embodiment corresponds to the focusing loop 70 shown in FIG. 1. Actuator 15 is shown in detail in FIG. 4. It includes a final controlling element 85, which controls a coil 35 (plunger coil) in a magnetic field 30. Actuator signal A coming from amplifier 55 is sent to final controlling element 85. The components of actuator 15 are shown in detail in FIG. 4. Final controlling element 85 derives a coil current S from actuator signal A, which flows through coil 35. Scanning device 1 is mechanically and rigidly connected to coil 35. A movement of coil 35 in magnetic field 30 thus leads to a corresponding movement of scanning device 1. Magnetic field 30 and coil 35 are arranged so that, when a current flows, the coil moves with scanning device 1 in the direction perpendicular to the plane of storage medium 10. Actuator simulator 90 corresponds functionally to final controlling element 85 and derives from actuator signal A the coil voltage US resulting from coil current S and delivers it to second comparator device 40. Final controlling element 85 derives a coil current S from actuator signal A, which is suitable for moving coil 35 in magnetic field 30 and thus moving scanning device 1 in the direction perpendicular to the plane of storage medium 10, so that the distance between scanning device 1 and storage medium 10 is corrected to or at least approaches preselected setpoint value 75 in this direction.

Due to the arrangement of coil 35 in magnetic field 30 and its mechanical connection to scanning device 1, coil 35 may also be used as a sensor to sense movements of scanning device 1 in the direction perpendicular to the plane of storage medium 10. In this regard, a coil current S' is induced in coil 35. Coil current S' is a measure of the acceleration of scanning device 1 as a function of acceleration acting on drive 5, because coil 35 is connected to the spring-mass system of scanning device 1 and its suspension in drive 5. Due to the arrangement of coil 35 in magnetic field 30, only acceleration acting in the same direction in which regulation of the position of scanning device 1 by actuator 15 may be detected. Acceleration of scanning device 1 and thus of coil 35 in directions not perpendicular to the plane of storage medium 10 does not induce any current in coil 35.

Coil current S supplied by final controlling element 85 is superimposed on current S' induced in coil 35 by the acceleration of scanning device 1 to yield a total coil current $S_{tot}$, which in turn yields a total coil voltage $U_{tot}$ on coil 35. Total coil voltage $U_{tot}$ is measured by second comparator device 40. Second comparator device 40 then subtracts the coil voltage US received from actuator signal 90 from total coil voltage $U_{tot}$. Coil voltage US supplied by actuator simulator 90 is the voltage obtained at coil 35 alone due to coil current S supplied by final controlling element 85 at coil 35, so that induced voltage U' obtained by the voltage subtraction in second comparator device 40 described above is obtained on the basis of induced coil current S' at coil 35. Induced voltage U', like induced coil current S', is a measure of the acceleration acting on scanning device 1 in the direction perpendicular to the plane of storage medium 10. From the known spring-mass system of scanning device 1 and its suspension in drive 5, the acceleration of drive 5 in the direction perpendicular to the plane of storage medium 10 may be determined from the acceleration of scanning device 1 in the direction perpendicular to the plane of storage medium 10, determined on the basis of induced voltage U'. Then, correction signal K may be derived from this acceleration of drive 5 and the known mass and spring constants of storage medium 10, which is inserted into drive 5, and is used to prevent or compensate for the deviations of scanning device 1 of storage medium 10 in the direction perpendicular to the plane of storage medium 10, which is to be expected on the basis of the acceleration of drive 5, in the manner described above with respect to the first exemplary embodiment with reference to FIG. 2.

Thus, within focusing loop 70, a second loop 95 is formed by amplifier 55, actuator simulator 90, actuator 15, second comparator device 40, second filter 65 and logic device 80.

Various exemplary embodiments according to the present invention have been described on the basis of regulation of the distance between scanning device 1 and storage medium 10 in the direction perpendicular to the plane of storage medium 10. However, regulation may be implemented in a direction in the plane of storage medium 10 in addition or as an alternative to the focus regulation described above. Regulation in a direction in the plane of storage medium 10 is referred to as tracking regulation. The number of possible directions for regulation of the position of scanning device 1 corresponds to the number of degrees of freedom of the overall system of drive 5 and components arranged therein. For each direction in which the position of scanning device 1 is to be regulated, a regulating device according to, for example, the first or second exemplary embodiment according to the present invention described above may be provided. In each of these regulating devices, the acceleration of scanning device 1 or of drive 5 is measured only in the direction in which the actuator of the corresponding regulating device is capable of altering the position of scanning device 1. For each possible regulation direction, a corresponding acceleration sensor may be provided, e.g., in the form of the actuator provided for the required regulating device or loop according to the second exemplary embodiment to determine the acceleration of drive 5 or scanning device 1 in this regulation direction.

In the first exemplary embodiment, acceleration sensor 20 measures the acceleration acting on drive 5, whereby the resulting acceleration of scanning device 1 may be indirectly determined through a knowledge of the mass and spring constants of scanning device 1. However, in the first exemplary embodiment, as in the second exemplary embodiment, the acceleration acting on scanning device 1 may be measured directly by acceleration sensor 20, and the acceleration acting on drive 5 and on storage medium 10 may be determined with respect to the second exemplary embodiment, so that after electronic processing by second filter 65 and amplifier 55, correction signal K thus formed controls actuator 15, so that it helps prevent a deviation of the distance of scanning device 1 from storage medium 10 in the corresponding direction from the correspondingly preselected setpoint value.

The internal resistance of final controlling element 85 and actuator simulator 90 should each be greater than zero to prevent voltage U' induced at coil 35 by the acceleration acting on scanning device 1 from being short-circuited. This may be accomplished, for example, by connecting coil 35 in series with a resistor to prevent a zero internal resistance of actuator simulator 90 and final controlling element 85. The resistance may amount, for example, to approximately 5 to 10% of the value of the coil resistance of coil 35.

What is claimed is:

1. A method of regulating a tracking of a scanning device of a drive for a storage medium, the method comprising:
    measuring a position of the scanning device with respect to the storage medium which has been inserted into the drive;
    comparing the position of the scanning device to a preselected position;
    controlling at least one actuator as a function of the comparison between the position of the scanning device and the preselected position, so that the scanning device is moved in a direction of the preselected position;
    measuring an external acceleration acting on the scanning device in one direction of movement of the at least one actuator;
    deriving a correction signal from the measured external acceleration; and
    sending the correction signal to the at least one actuator;
    wherein the at least one actuator is controlled by the correction signal, so that the at least one actuator counteracts the measured external acceleration acting on the scanning device, and wherein the at least one actuator is used as an acceleration sensor.

2. The method according to claim 1, wherein the scanning device includes a read/write head.

3. The method according to claim 1, wherein the external acceleration acting on the scanning device in one direction of movement of the at least one actuator is measured by the acceleration sensor.

4. A drive for a storage medium, comprising:
    a scanning device for scanning the storage medium which has been inserted into the drive;
    at least one position sensor for measuring a position of the scanning device with respect to the storage medium;
    a first comparator device for comparing the measured position of the scanning device with a preselected position;
    at least one actuator controlled by the first comparator device as a function of the comparison between the measured position of the scanning device and the preselected position, so that the scanning device is moved in a direction of the preselected position; and
    a measuring arrangement for measuring an external acceleration acting on the scanning device in one direction of movement of the at least one actuator;
    wherein a correction signal is derived from the measured external acceleration and sent to the at least one actuator, and wherein the at least one actuator is controlled by the correction signal so that the at least one actuator counteracts the measured external acceleration acting on the scanning device, and wherein the measuring arrangement includes the at least one actuator, the at least one actuator being configured to provide an output used for measuring the external acceleration.

5. The drive according to claim 4, wherein the scanning device includes a read/write head.

6. The drive according to claim 5, wherein the measuring arrangement includes at least one acceleration sensor.

7. The drive according to claim 4, further comprising:
    a second comparator device;
    wherein the at least one actuator includes a plunge coil situated in a magnetic field and connected to the scanning device, so that the plunge coil moves with an acceleration of the scanning device in the magnetic field, a coil current being induced in the plunge coil; and
    wherein the second comparator device extracts an induced coil voltage in the plunge coil from a total voltage applied to the plunge coil and derives a correction signal from the induced coil voltage, and wherein the second comparator device sends the correction signal to the at least one actuator for counteracting the measured external acceleration.

8. The drive according to claim 7, wherein the second comparator device subtracts a voltage applied to the plunge coil by a control of the at least one actuator from the total voltage applied to the plunge coil, and wherein the second comparator device extracts the induced coil voltage based on a result of the subtraction.

* * * * *